United States Patent
Landy (10) Patent No.: US 10,257,461 B2
(45) Date of Patent: *Apr. 9, 2019

(54) DIGITAL CONTENT CONVERSION QUALITY CONTROL SYSTEM AND METHOD

(71) Applicant: NBCUniversal Media, LLC, New York, NY (US)

(72) Inventor: Harvey Landy, Simi Valley, CA (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,345

(22) Filed: Dec. 5, 2017

(65) Prior Publication Data

US 2018/0098023 A1 Apr. 5, 2018

Related U.S. Application Data (63) Continuation of application No. 14/270,474, filed on May 6, 2014, now Pat. No. 9,866,788.

(51) Int. Cl.
*H04N 7/01* (2006.01)
*H04N 7/015* (2006.01)

(52) U.S. Cl.
CPC ............. *H04N 7/01* (2013.01); *H04N 7/0117* (2013.01); *G09G 2340/0442* (2013.01); *H04N 7/015* (2013.01); *H04N 7/0122* (2013.01); *H04N 7/0125* (2013.01)

(58) Field of Classification Search
CPC .. H04N 7/0122; H04N 7/0127; H04N 7/0125; H04N 7/015; H04N 7/0117; G09G 2340/0442
USPC .................................................. 348/441–459
See application file for complete search history.

(56) References Cited

U.S. PATENT DOCUMENTS

| | | | |
|---|---|---|---|
| 4,897,799 A * | 1/1990 | Le Gall | G06F 3/14 345/428 |
| 7,551,198 B2 | 6/2009 | Kawanda et al. | |
| 9,313,401 B2 | 4/2016 | Frey et al. | |
| 2011/0025911 A1 | 2/2011 | Weisgerber | |
| 2016/0127440 A1* | 5/2016 | Gordon | H04N 21/23439 709/219 |

* cited by examiner

*Primary Examiner* — Jefferey F Harold
*Assistant Examiner* — Omer Khalid
(74) *Attorney, Agent, or Firm* — Fletcher Yoder, P.C.

(57) ABSTRACT

Automated, algorithmic quality control is performed for digital content converted from one form or format to another. Such conversion may be made of movies, television programs, feature films, advertisements, or any other content. The conversion process may be semi or fully automated, and may include a range of alterations, such as pulldown or frame rate conversions, size and/or resolution conversions, addition of content, deletion of content, and so forth. Actual content contained in pre-and post-converted frames is utilized, such as by image recognition techniques, as a base for the quality control routines. Audio data may also be considered. The quality control is fully or nearly fully automated with minimal manual involvement.

18 Claims, 4 Drawing Sheets

DIGITAL CONTENT CONVERSION QUALITY CONTROL SYSTEM AND METHOD

CROSS REFERENCE TO RELATED APPLICATIONS

This application is a continuation of U.S. patent application Ser. No. 14/270,474 filed on May 6, 2014, which is hereby incorporated by reference herein in its entirety for all purposes.

BACKGROUND

The present invention relates generally to field of digital content conversion, and particularly to systems for verifying quality of such conversions in an automated fashion.

Many different formats, systems and media have been used and are currently used for creating and delivering digital content to audiences. Historically, these included film that was used to capture scenes, with segments of film being exposed, developed, processed, and post-processed to render the desired content, typically movies. Increasingly, digital media are used for this purpose. Such media has included video tape, direct digital capture technologies, and so forth. Where legacy libraries exist, such as on original film, these can be digitized and converted to forms that can be electronically stored, transmitted, and manipulated.

It is common to convert such digital content from one form or version to another. For example, studios and content providers may store only one or a handful of versions of a particular movie, television show, presentation, or other content, while distributers, playback devices and systems may require or function best with other versions. By way of example, a traditional film media utilizes a nominal frame rate of 24 frames/sec, while many products may be delivered at a different frame rates, such as a nominal 30 frames/sec, or in some regions 25 frames/sec. Thus, a conversion of the original version to the desired version is needed. Such conversions may also change the size of the frames, certain portions of the content, add too or extract segments to the content, and so forth. These conversions may be performed in automated or semi-automated systems, and often require some quality control to verify that the conversion was accurate, that errors did not occur in conversion of frame rates, sizes, content, and so forth. Many such errors may arise, it is useful to verify the conversion prior to delivery to audiences and distributors.

Historically, however, such quality control has been spotty. That is, many aspects of the quality control are manually very demanding, requiring hours or days for a human operator to check aspects of the conversion, content, synchronization, and so forth. Even where automated systems have been developed, these typically require very substantial human interaction. As a result, the quality control is either not fully performed, is expensive, and can result in a "false pass", that is, an indication that the quality is as desired, when in reality it is not. While attempts have been made to improve such quality control, they have not alleviated the costly and time-consuming manual requirement, or even particularly improved quality control results.

There is a need, therefore, for improved techniques for verification of quality in digital content conversion. There is a particular need for processes that can effectively allow for automated conversion with automated quality control and little or no manual intervention.

BRIEF DESCRIPTION

The present disclosure presents systems and methods designed to respond to such needs. In accordance with certain aspects of the disclosure, a method comprises, for a digital video content file comprising successive frames of video content, converting the file from a first version at a first frame rate to a second version at a second frame rate. An automated, algorithmic quality control process is performed by referencing a desired frame in the first version to a corresponding desired frame in the second version.

Also disclosed is a method that comprises, for a digital video content file comprising successive frames of video content, converting the file from a first version at a first frame rate to a second version at a second frame rate through a 24-frame to 30-frame conversion, or a 24-frame to 25-frame conversion. An automated, algorithmic quality control process is performed by referencing a desired frame in the first version to a corresponding desired frame in the second version and by referencing at least one subsequent frame in the first version to a corresponding subsequent frame in the second version to verify that the versions are properly converted. An operator is notified of at least defects in the conversion as detected by the quality control process.

Also disclosed is a method that comprises receiving an order for digital video content in a second version different from a first version, each of the versions comprising successive frames of video content, and converting a file from the first version at a first frame rate to the second version at a second frame rate through a 24-frame to 30-frame conversion, or a 24-frame to 25-frame conversion. An automated, algorithmic quality control process is performed by referencing a desired frame in the first version to a corresponding desired frame in the second version and by referencing at least one subsequent frame in the first version to a corresponding subsequent frame in the second version to verify that the versions are properly converted, and an operator is notified of at least defects in the conversion as detected by the quality control process. The second version is stored and/or transmitted for delivery in accordance with the order.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
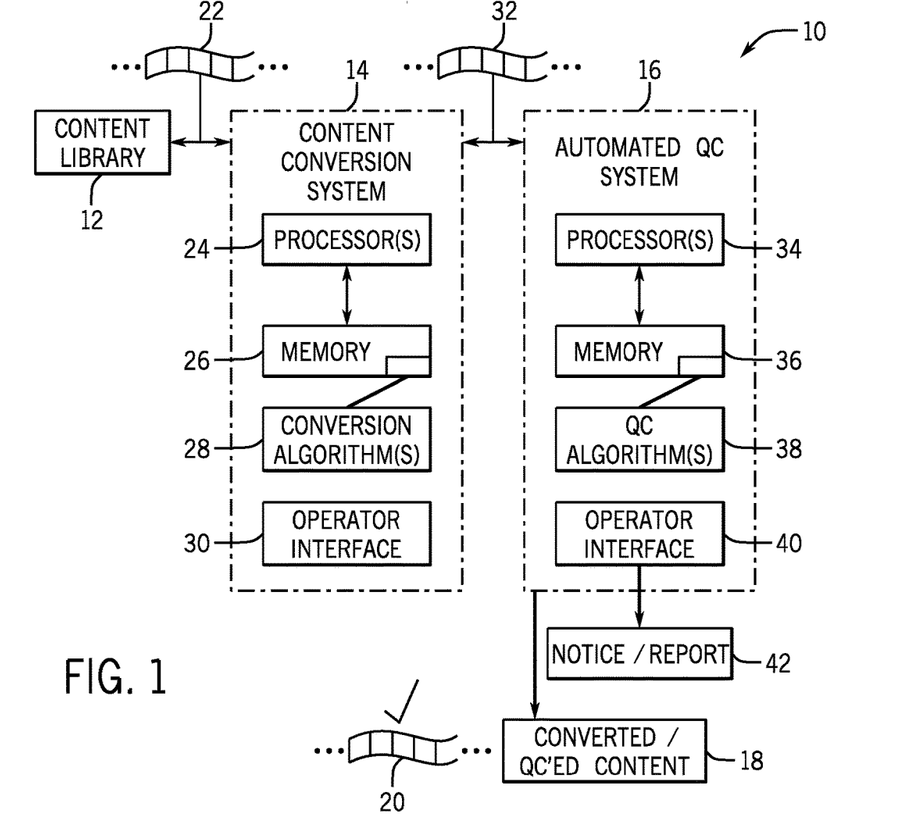
FIG. 1 is a diagrammatical representation of a digital content conversion and quality control system in accordance with aspects of the present techniques.

FIG. 1 illustrates an exemplary digital content conversion and quality control system designated by reference numeral 10. The system may be implemented and embodied in a single entity, or certain functions may be separated between entities, computers, service providers, and so forth. In general, the system operates on content that may be drawn from a content library 12. In many systems, the content library will be digitized so that individual elements of content may be drawn directly from the library and used for the conversion and quality control. In other contexts, such libraries will include content that is supported on media that may require digitization. Such digitization may be performed in any conventional manner, and is generally beyond the scope of the present disclosure. The content library may house any desired form of content, such as movies, features, television programs, presentations, and the like. In general, however, the content of interest here will include video and/or audio content that will be converted from one form to another by a content conversion system 14. Once the content conversion is complete, or at certain milestones in the completion of the content conversion, an automated quality control system 16 verifies that the conversion is accurate or at least within certain parameter ranges that are considered acceptable. The output of the automated quality control 16 will be a converted and quality controlled content version 18. In many cases this will consist of a digital file that may have appended metadata indicating its identification, the results of the quality control and conversion and so forth. Ultimately, a content output file 20 is created that again will typically will be stored and distributed in a digital format. However, it should be understood that such output could be supported in other formats, including film.

Returning to the content library, in a particular instance of conversion, a first version 22 will be drawn from the content library, typically by reference to titles, numerical designations, alphanumerical designations, file names, creation dates, and so forth. The content conversion system 14 will receive such files and will perform conversion to a different version. This conversion may be fully automated or may be semi-automated or even manual as so much as the original version is identified and selected, and the conversion process is initiated. However, once initiated, the content conversion system will typically operate in a fully automated manner, with little or no human intervention. Accordingly, the content conversion system 14 includes one or more processors 24 that are provided with associated memory 26. The processors implement conversion algorithms 28 stored in the memory and the memory itself may store the original version 22 and any intermediate data created during the conversion process. The conversion algorithms 28 may be any algorithms presently known or later developed, and will typically allow for conversion of frames and frame rates, sizes, certain aspects of content (e.g., addition of supplemental content such as voiceovers, captions, and so forth). An operator interface 30 is typically provided to allow an operator to interact with the one or more processors so as to launch conversions, monitor conversions, and interact with the system on an as-needed basis.

The content conversion system 14 thus produces a second version 32 which corresponds to the original version 22 but will be in a different form. This form is then quality checked either at the completed stage or at intermediate stages through the automated control system 16. The system 16 itself may comprise one or more processors 34, associated memory 36, and quality control algorithms 38 that may be stored in the memory along with the second version 32, and any intermediate data created. The automated quality control algorithms 38 are described in greater detail below, and will typically be fully automated so long as the conversion is determined to correspond to desired parameters. Where conversions fail or fall outside of desired parameters (i.e., an "exception"), the algorithms may call for notification or reporting to a human operator, a human operator intervention, or other exceptions to the normal algorithmic, automated process. Thus, one or more operator interfaces 40 may be provided to permit such interactions. The resulting converted and quality controlled content 18 may, as noted above, include embedded and/or metadata that indicates parameters of the conversion, original and converted file designations, dates and/or systems used in the conversion, parameters and results of the quality control, and so forth. Similarly, various notices and reports 42 may be created that indicate similar data, and that track both conversions and quality control. Such notices and reports may be formed for a successful quality control as well as for "failed" quality control results. In general, such notices and reports may also be generated as part of a workflow that is included in various transactions, post-processing service provision, and so forth.

Figure 2:
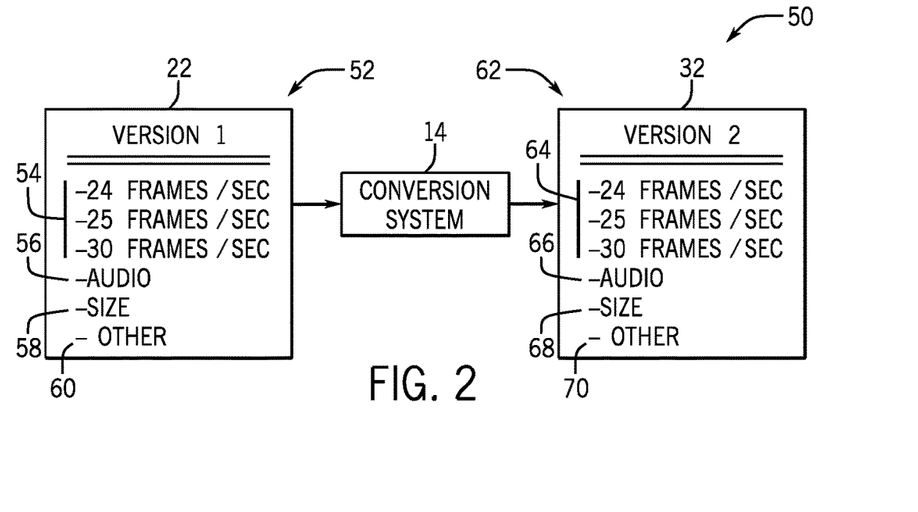
FIG. 2 illustrates an exemplary conversion from a first version of the content to a second version with various characteristics being available and used in the conversion.

FIG. 2 illustrates typical conversion 50 from a first version 22 to a second version 32 as mentioned above. The conversion system 14 receives the first version 22 that will have various characteristics, indicated generally by reference numeral 52. In the illustrated embodiment, the first version 22 is a video file that has associated audio. Thus, the video file characteristics will have a frame rate 54 in which it was originally captured, or resulting from some earlier conversion. The video will typically be accompanied by audio data 56 that may comprise original captured sound, sound tracks, music, special effects, and so forth. Another characteristic 52 will be the size 58 of the frames, including the height and width dimensions of the frame and pixel sizes resulting in a resolution within the frames. Other data 60 may also be included in the version, such as additional added content (e.g., voiceovers, captions) metadata, and so forth. The conversion system 14 creates the second version based upon parameters specified for the conversion. These parameters will typically define the algorithm or performance of the algorithm used in the conversion. In the illustrated embodiment, the second version 32 thus has its own characteristics 62 that are different from those of the first version. These may include a different frame rate 64, different audio data 66, a different size 68, or various other data 70 of the type discussed above.

Figure 3:
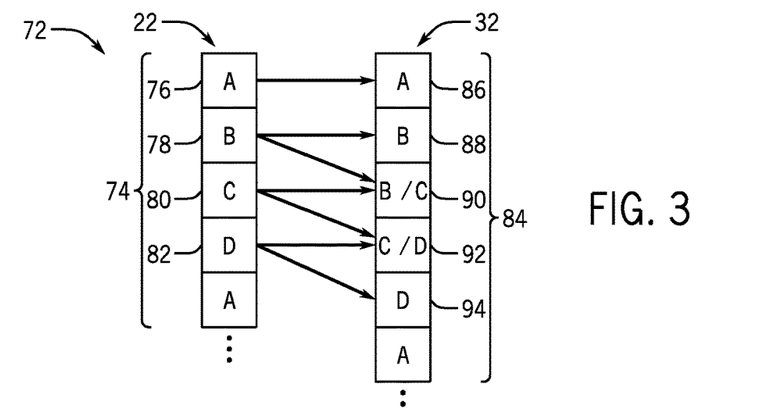
FIG. 3 is a diagrammatical representation of a "2:3" pull-down conversion.

As noted above, a number of different conversions and conversion parameters may be utilized for the conversion and quality control. Indeed, certain types of conversions may be more demanding from a quality control aspect. These may include so-called "pulldowns" of the type illustrated in FIG. 3. As will be appreciated by those skilled in the art, in many contexts, such pulldown conversions involve transformation between a first number of frames or frame rates to a different number of frames or frame rates. Such conversions may be adapted to convert the first version from, for example, a nominal 24 frame/sec rate to a nominal 30 or 25 frames/sec. The illustration of FIG. 3 is sometimes referred to as a 2:3 pulldown conversion. In this conversion, designated generally by reference numeral 72, the first version 22 will be considered to have a series of frames 74 of which four successive frames are designed A B C and D, as indicated by reference numerals 76, 78, 80 and 82, respectively. The second version 32 will similarly have a series of frames 84 wherein a first A frame 86 will generally correspond to the A frame 76 of the first version, as will a B frame 88 corresponds to a B frame 78. However, to provide a smoother and more convincing display in the new format, the third frame 90 of the second version 32 will combine frames B and C of the first version. Similarly, the fourth frame 92 will combine data from the C and D frames of the first version. Thereafter, the D frame 94 of the second version will generally correspond to the D frame 82 of the first version.

A number of other frame rate conversions may be utilized. These include 2:2 pulldowns, 3:2 pulldowns, as well as a range of other pulldown patterns. As will be appreciated by those skilled in the art, the 2:3 pulldown effectively converts a nominal 24 frames/sec to a nominal 30 frames/sec for video. Given the ration of nearly 4:5, the conversion illustrated in FIG. 3 effectively converts four frames of film (or more generally, of original content) for every 5 frames of video (or more generally, converted content). As will be appreciated by those skilled in the art, various corrections for these nominal settings are typically made (e.g., due to the fact that the actual frame rates do not technically create a precise 4:5 ratio).

Figure 4:
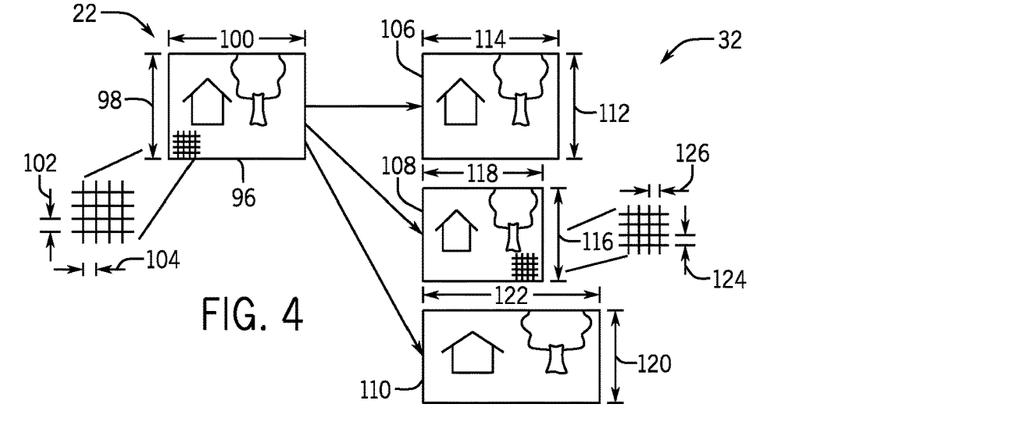
FIG. 4 is a diagrammatical representation of a conversion involving alteration of the size of frames between versions.

In addition to frame rate adjustments, the conversion may entail size and/or resolution changes as well. FIG. 4 illustrates such size and/or resolution conversions. In the illustration, the first version 22 may be converted to one or more second versions 32 with the first version having a frame 96 of a given height 98 and width 100. The heights and widths will typically be standard, and will correspond to desired formats for film, video, or any other standard version. Moreover, the content encoded in the frames will be made up of picture elements or pixels that have known heights 102 and widths 104. The size and resolution of the frame are thereby defined by the dimensions of the frames and the dimensions of the pixels.

In the conversion, one or more output formats may be utilized as indicated by reference numerals 106, 108, and 110. In the simplest example, the same format may be used as in the case of frame 106 with a height 112 corresponding to the original height 98 and the width 114 corresponding to the original width 100. The pixels may remain unchanged as well. This type of conversion may nevertheless involve other conversion aspects, including frame rate conversions, content insertions, content changes, content deletions, and the like. However, different formats and sizes may result, as indicated by reference numeral 108 for a reduced size. Here, the original height 98 is converted to an output height 116, where the original width 100 is converted to an output width 118. Similarly, output pixel sizes may be altered as indicated by dimensions 124 and 126.

Such formats may result from cropping, shrinking, and so forth. In a contrary fashion, a format 110 may have dimensions 120 and 122 and may result from stretching of the original data. In many cases, shrinking and stretching will result in different pixel dimensions as well.

Figure 5:
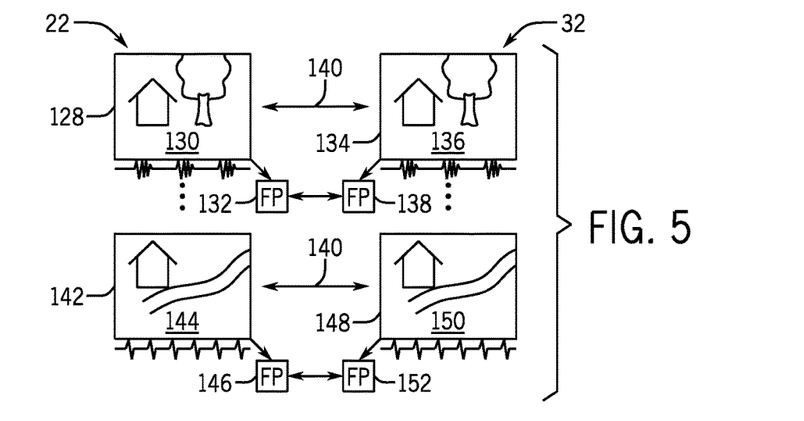
FIG. 5 is a diagrammatical representation of content verification that may be used in the automated quality control techniques.

The present techniques for automated quality control may function in accordance with any desired parameters, particularly parameters related to the frame rate conversion and size conversion. To perform the quality control, reference will be made to the content of the frames such that the frame rate conversion can be properly verified, audio can be verified, sizes and size conversions can be verified, and so forth. In the illustration of FIG. 5, reference is made to content within individual frames in order to verify that appropriate conversion of frame rates, content, frame size, and the like have been made. In the example, a desired or reference frame 128 is selected in the first version 22. The content 130 of the frame is analyzed and image recognition techniques are employed for determining parameters or characteristics of the content. Such techniques may involve image matching data, such as fingerprints 132. As will be appreciated by those skilled in the art, such fingerprint data may be derived from the image data by reference to individual pixels, lines, regions, or any other parameter of the image, and may be reduced to a simple value that can be easily compared to a corresponding value of frames in the second version. Thus, in corresponding frame 134 in the second version is selected that comprises content 136. The content 136 is used to derive similar data 138 that can be used in a comparison as indicated at reference numeral 140.

The content of the frames thus allows the algorithmic system to determine whether a frame is properly converted from the first version to the second version, such as in the cases involving size and/or resolution conversion. The content comparison may also be used to verify, in part, whether frame rates have been properly converted. In many cases it will be advantageous to compare the same frames in the series of frames comprising each version, beginning with a known frame. Such selection may be made based upon, for example, comparison of an A frame to an A frame, comparison of a B frame to a B frame, or comparison of a D frame to a D frame, to use the 2:3 pulldown discussed above as an example. Such comparisons may be advantageous because they do not entail composite data produced by a combination of the data from two frames. However, in certain contexts, appropriate data may be derived even from these frames and utilized for the comparison. Moreover, in many cases it may be advantageous to select the A frames, such as by reference to an "hour 1" starting point in the content.

It should also be noted that waveform comparisons for audio data may be made as illustrated by the waveform plots in FIG. 5 corresponding to frames 128 and 134. In general, it will be desired that the audio data remain synchronized with the video data to provide the best audience experience regardless of the version and conversion. This audio comparison may be made instead of or in addition to the video comparisons discussed above. Such comparisons may greatly enhance the algorithmic quality control and may be used to usefully supplement the video comparisons. Such audio comparisons also allow for verification of synchronization of the audio and video within acceptable parameters.

As also illustrated in FIG. 5, certain subsequent frames may be compared to verify the conversions. A subsequent frame 142, for example, may include content 144 which will in most cases be different from the content 130 of the earlier frame 128. Fingerprint or other image matching data may thus be derived from the content as indicated at reference numeral 146. A corresponding subsequent frame 148 is then selected that should have content 150 that corresponds to content 144. Fingerprint or other image matching data 152 may thus be derived from this content. A further comparison is made of this content to verify, for example, that the frame rate conversion has properly occurred. By way of example, frames 128 and 134 may correspond to A frames 76 and 86 of FIG. 3, whereas frames 142 and 148 may correspond to subsequent A frames or to other frames in the series. If the conversion has been properly made, the content should continue to correspond over the length of the video. As before, comparisons may be made also to audio data as indicated by the waveforms below frames 142 and 148. Here again, such verification may assist in automatically verifying that the conversion was appropriate, that the audio is still synchronized with the video, and so forth.

Many other factors may factors may be automatically quality controlled, although the frame rate conversion, size and format conversion, and content check will provide greatly improved algorithmic and automated quality control not offered by existing techniques. Other factors that may be automatically checked might include, for example, sound effects, captioning, language aspects, multi-channel audio waveform verification (e.g., to verify that all waveforms are appropriate on a channel-by-channel basis), aspect ratio, multichannel audio waveform verification, audio synchronization verification, audio and video levels, metadata header verification, codec conformance verification.

As noted above, quality control performed as described here is done automatically and algorithmically with little or no operator intervention. The quality control will typically be part of the conversion process, and may be performed after final conversion (e.g., once the entire first version is converted to the entire second version), or at other (e.g., intermediate) points in the conversion. Such other points may include, for example, random time selection, periodic time selection, selection at specific points in the content (e.g., scene changes), and so forth. If performed at these milestones or stages, the quality control process may proceed as described, and the conversion may proceed if the quality parameters are found to be within desired ranges, or the process may be aborted, noting the exception, if a quality control check fails. In general, tolerances will be allowed in the quality control that permit "passing" the control checks regardless of certain deviations within acceptable tolerances. Such tolerances may include, for example, cadence (with small or no tolerance), image size (e.g., by title and/or production number, with reference to container or window size, limited image size tolerance). Other tolerances may be imposed for the other factors outlined above.

Figure 6:
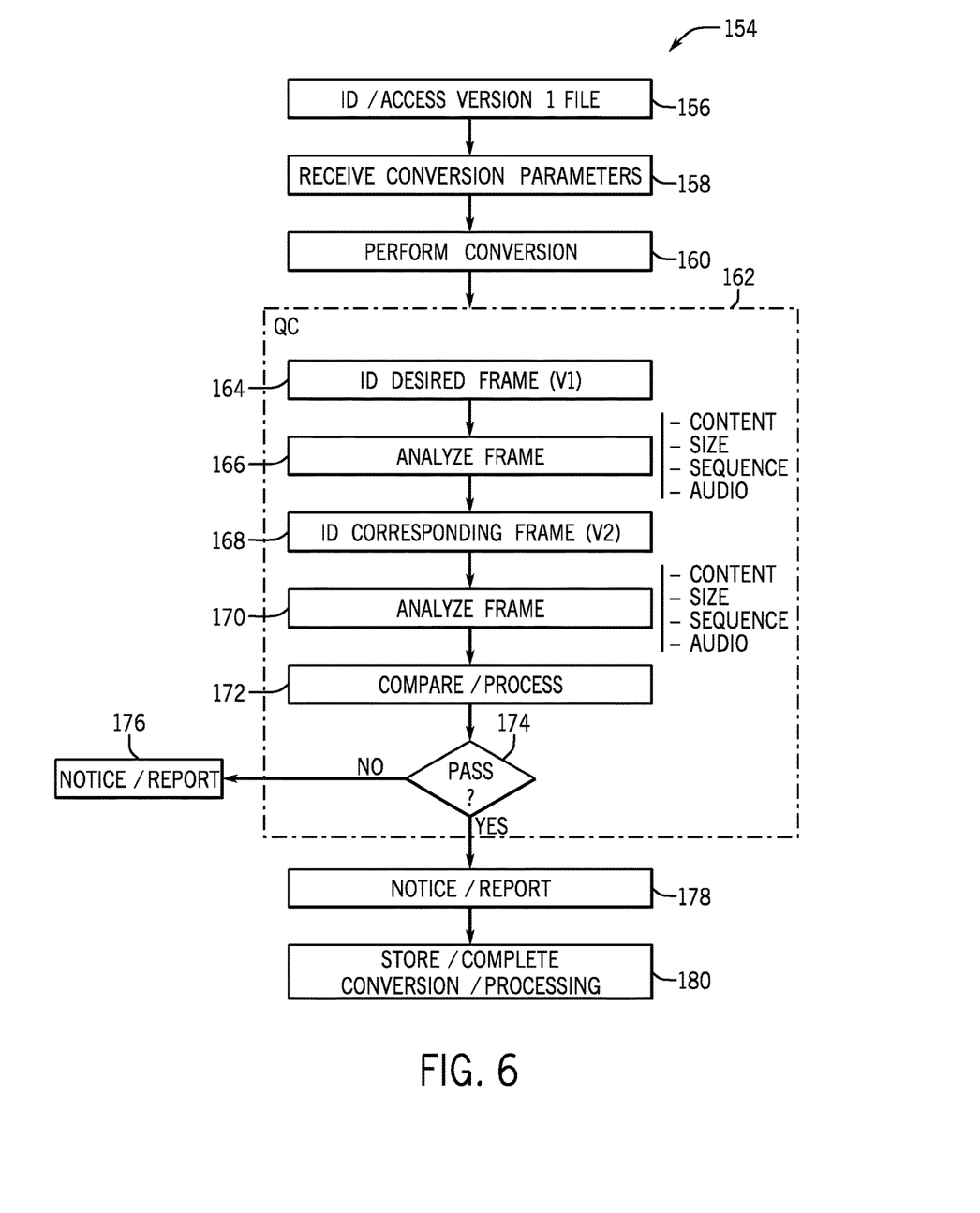
FIG. 6 is a flow chart illustrating exemplary logic for converting and automatically checking quality of digital content versions.

The automated conversion and quality control processes is illustrated diagrammatically in FIG. 6, which shows exemplary logic 154 for carrying out the automated, algorithmic process. At step 156 the file corresponding to the first version is identified and accessed. It will typically be transmitted, transferred, or downloaded to the conversion system. The conversion system will then receive the conversion parameters as indicated by reference numeral 158. Such parameters may include, for example, the desired rate conversions, desired size conversions, desired image matching parameters and techniques, and so forth. The parameters will also typically include the tolerances allowed for the checked characteristics as mentioned above. At step 160, then, the conversion is performed either completely or partially.

The quality control process 162 follows full or partial conversion. As noted above, for example, at step 164 a desired frame in the first version may be identified, such as an "hour 1" or first frame (e.g., an "A frame in a nominal 24 frame/sec version). At step 166 this frame is analyzed to determine its parameters, such as the content, the size, the location in the frame sequence, any associated audio data, and so forth. As noted above, such characteristics may be reduced to numerical values, and in some cases may reduced to scalar values to ease comparison. At step point 168 a corresponding frame is identified in the second version. Such identification may be made by reference to image matching data derived from the content of the frames, counting of the frames, certain imbedded or associated queues, time codes, metadata, or any other desired data. At step 170 this frame is analyzed as was the corresponding frame of the first version. Here again, such analysis may include analysis of the content, the size, the location in the sequence of frames, any audio data, or any other associated data. At step 172 a comparison is made between these two frames to verify that they, in fact, correspond to one another appropriately. At step 174 a determination is made whether the desired parameters utilized in the comparison do, in fact, correspond to the tolerance range allowed for the conversion. If the results of the comparison indicate that the parameters fall outside of the tolerance, a notice or report is provided at step 176 that effectively indicates an exception that should be addressed. Such exceptions may be addressed manually or in the automated or semi-automated manners. If the results of the comparison indicated that all desired parameters fall within the tolerances, a notice or report may be generated to this effect as indicated at reference numeral 178. The resulting version and any associated data may then be stored as indicated at reference numeral 180. As noted above, the storage may include storage of quality control data, parameters used for the used for the quality control process, the parameters used for the conversion process, and so forth. In certain contexts, the versions may be stored permanently or may be used only for order or distribution completion, and may not be returned to the long-term library. In other contexts, these versions may be stored in the long-term library and used any time that a similar second, converted version is required.

Figure 7:
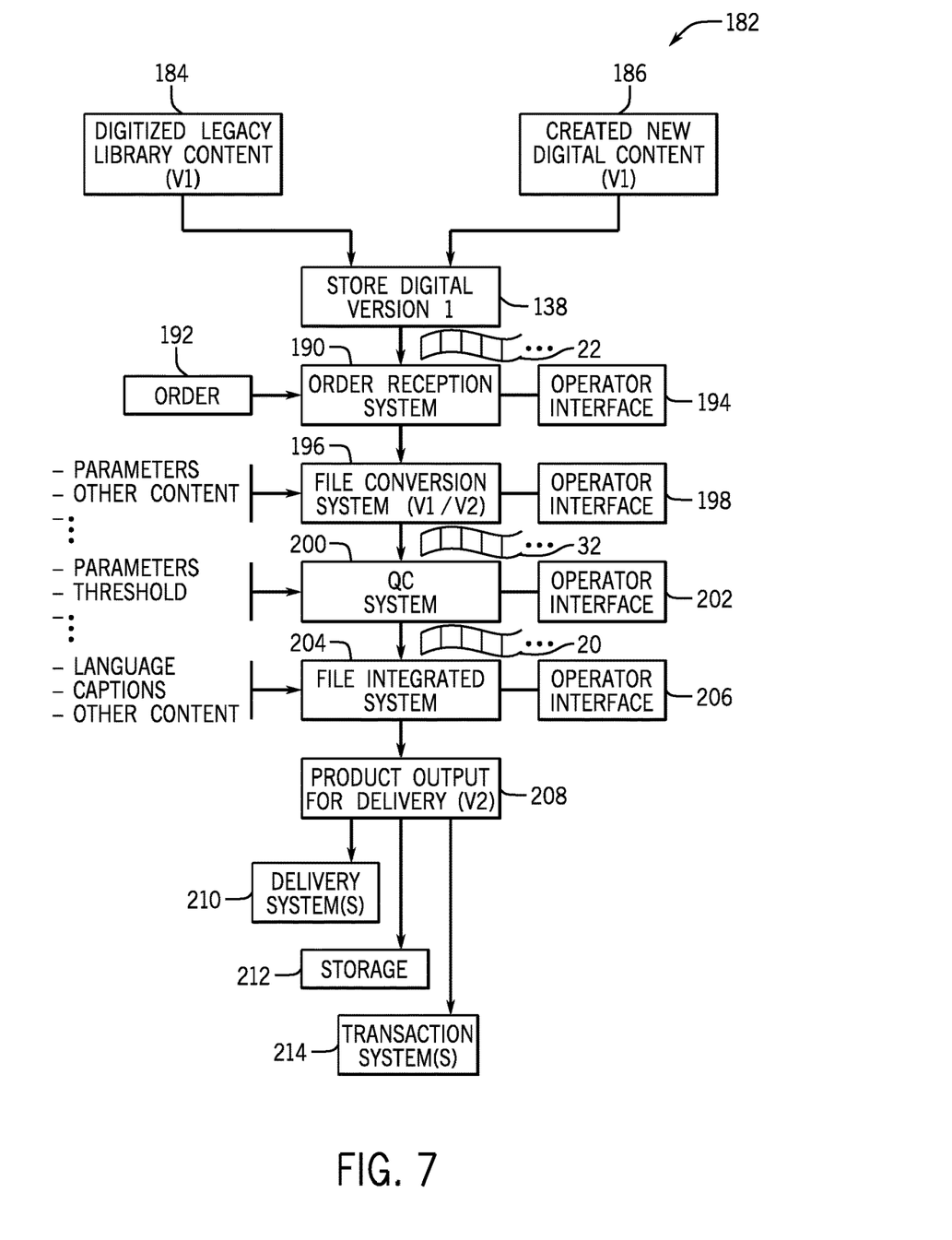
FIG. 7 is a diagrammatical representation of a system for automated order completion that includes automated file conversion and quality control.

The foregoing automated and algorithmic conversion and quality control process may form part of a larger transaction process designed for receipt of orders, conversion, quality control, and delivery and distribution of selected content. A system designed with this in mind is illustrated in FIG. 7 and designated generally by reference numeral 182. The system draws a first version of desired content from a digitized legacy library 184. As noted above, such libraries may contain content that is supported on non-digital media, and in such cases, the content will typically be digitized by known techniques. The content may also be drawn from newly created digital content as indicated by reference numeral 186. This will typically be the case for present and future content that is either captured directly in digital form or converted into digital form during a processing, post-processing, and so forth. The selected content version is then stored as indicated at reference numeral 188. This may be done in the digital library or legacy library, but will typically also be done in some data store that is made accessible to the order processing system. The version thus stored corresponds to version 22 discussed above.

An order reception system 190 serves to receive orders 192 for the content. The order reception system may include one or more computers, and will typically include a number of computers that may be located at different locations, and that run software or firmware designed to interact with customers and clients, distributors, broadcasters, consumers, and the like, such as via on-line order placement. The order reception system may also include one or more operator interfaces where desired. It should be noted, however, that the order reception system may be fully or almost entirely automated except for functions that can use or benefit from intervention by a human operator, such as exceptions in the order process, customer service, and so forth.

Based upon orders received, the file conversion system 196, which generally corresponds to the conversion system 114 discussed above, retrieves the first version 22 and converts it to the desired second version 32. The conversion will typically be done in accordance with the order 192. Here again, an operator interface 198 may be provided to facilitate the conversion, although in many cases the conversion will be fully or semi-automatic. The conversion will typically specify various parameters and other content in accordance with the order and with the parameters of the first version 22. As noted above, such parameters may include, for example, frame rates, sizes, resolution, audio data, languages, captions, special effects, additional or supplemental content, deletions of content, and so forth. At the point of full conversion or at any intermediate point during the conversion, then, the quality control system 200 acts to determine whether the conversion is properly carried out. This automated and algorithmic quality control may follow the general processes outlined above. Here again, the quality control will typically be based on certain parameters and thresholds for features or characteristics of the conversion that are checked. As also noted above, "passes" and "failures" may be indicated both in the resulting content and certain reports. Where desired, one or more operator interfaces 202 may be provided, such as for handling exceptions, and so forth. The resulting output file 20 is thereby produced.

A file integration system 204 is also provided that allows for the converted and checked second version to be integrated with any other components that are desired. First components may be defined by the order, and may correspond to distributor desires, customer desires, regional considerations, demographic considerations, and any other desired considerations. The file integration system may introduce, alter, add or delete such characteristics as language, captions, product placements, advertisements, previews, add-on content and features, and any other desired content. Here again, the file integration system may be provided with one or more operator interfaces 206 to facilitate this process and/or to handle any exceptions or special cases. Ultimately, a product output is produced for delivery as indicated at block 208. This output will typically correspond to the order 192, including the conversion, the quality control checks, and any integration with additional or different content, or any other adaptation performed by the file integration system. The product is then provided to one or more delivery systems 210, such as via the Internet, the physical media that is transported to distributors, broadcasters, consumers, and any other ordering entity. As indicated at block 212, the product may also be stored. As noted above, this storage may be short-termed or long-termed, such that the resulting product may be essentially discarded to be reproduced on an "as-ordered" basis, or it may be stored for completion of subsequent orders of the same type. Finally, the product and results of the process are noted in one or more transaction systems 214. Where the transaction, as will be typical, is performed as a commercial process, the transaction systems will allow for billing, tracking, notification of account status, and other transactional functions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising a controller configured to:
convert a digital video content file comprising successive frames of video content from a first version at a first frame rate to a second version at a second frame rate that is different from the first frame rate; and
perform an automated quality control process by:
identifying a frame in the first version;
determining a corresponding frame in the second version that corresponds to the frame in the first version;
identifying at least one subsequent frame in the first version;
determining a corresponding subsequent frame in the second version that corresponds to the at least one subsequent frame in the first version; and
analyzing content of the frame in the first version and content of the corresponding frame in the second version to verify that the second version is properly converted by comparing at least one characteristic of the content of the frame in the first version to at least one characteristic of the content of the corresponding frame in the second version, and by comparing at least one characteristic of the at least one subsequent frame in the first version to at least one characteristic of the corresponding subsequent frame in the second version.

2. The system of claim 1, wherein the controller is configured to convert the digital video content file by converting frames in the first version to frames in the second version, and wherein a first subset of the frames are combined in the second version, and a second subset of the frames are not combined.

3. The system of claim 1, wherein the conversion of the digital video content file comprises a 2:3 or a 3:2 pulldown conversion.

4. The system of claim 1, wherein the conversion of the digital video content file comprises a nominal 24-frame to a nominal 30-frame conversion.

5. The system of claim 1, wherein the controller is further configured to provide an operator perceptible notice if the quality control process identifies a defect in converting the digital video content file.

6. The system of claim 1, wherein the controller is further configured to store the second version if the automated quality control process indicates that converting the digital video content file was not defective.

7. The system of claim 1, wherein the controller is configured to perform the automated quality control process by analyzing sizes of frames of the first version with frames of the second version.

8. The system of claim 1, wherein the content of the frame and the corresponding frame are analyzed by image recognition.

9. The system of claim 8, wherein the image recognition comprises fingerprinting the content of the frame and the content of the corresponding frame.

10. The system of claim 1, wherein converting the digital video content file and performing the automated quality control process comprise parts of an automated content order fulfillment process.

11. A tangible, non-transitory, machine-readable medium, comprising machine-readable instructions to:
convert a digital video content file comprising successive frames of video content from a first version at a first frame rate to a second version at a second frame rate that is different from the first frame rate; and
perform an automated quality control process by:
identifying a frame in the first version;
determining a corresponding frame in the second version that corresponds to the frame in the first version;

identifying at least one subsequent frame in the first version;

determining a corresponding subsequent frame in the second version that corresponds to the at least one subsequent frame in the first version; and analyzing content of the frame in the first version and content of the corresponding frame in the second version to verify that the second version is properly converted by comparing at least one characteristic of the content of the frame in the first version to at least one characteristic of the content of the corresponding frame in the second version, and by comparing at least one characteristic of the at least one subsequent frame in the first version to at least one characteristic of the corresponding subsequent frame in the second version.

12. The machine-readable medium of claim 11, wherein the instructions to convert the digital video content file further comprises instructions to convert frames in the first version to frames in the second version, wherein a first subset of the frames are combined in the second version, and a second subset of the frames are not combined.

13. The machine-readable medium of claim 11, wherein the conversion of the digital video content file comprises a 2:3 or a 3:2 pulldown conversion.

14. The machine-readable medium of claim 11, wherein the conversion of the digital video content file comprises a nominal 24-frame to a nominal 30-frame conversion.

15. The machine-readable medium of claim 11, further comprising instructions to provide an operator perceptible notice if the quality control process identifies a defect in converting the digital video content file.

16. The machine-readable medium of claim 11, further comprising instructions to store the second version if the automated quality control process indicates that converting the digital video content file was not defective.

17. The machine-readable medium of claim 11, wherein the instructions to perform the automated quality control process further comprises instructions to analyze sizes of frames of the first version with frames of the second version.

18. The machine-readable medium of claim 11, wherein the content of the frame and the corresponding frame are analyzed by image recognition, and wherein the image recognition comprises fingerprinting the content of the frame and the content of the corresponding frame.

* * * * *